United States Patent [19]
Nakazawa

[11] Patent Number: 6,107,776
[45] Date of Patent: Aug. 22, 2000

[54] INVERTER CONTROL DEVICE

[75] Inventor: Yosuke Nakazawa, Tokyo, Japan

[73] Assignee: Kabushiki Kaisha Toshiba, Kawasaki, Japan

[21] Appl. No.: 09/239,759

[22] Filed: Jan. 29, 1999

[30] Foreign Application Priority Data

Jan. 30, 1998 [JP] Japan .................................. 10-019584

[51] Int. Cl.$^7$ ...................................................... H02P 7/628
[52] U.S. Cl. .......................... 318/811; 318/254; 318/138; 318/439; 318/449; 318/801; 318/800; 318/799; 318/807; 318/700; 318/727
[58] Field of Search ..................................... 318/811, 138, 318/254, 439, 449, 801, 800, 799, 807, 700, 727

[56] References Cited

U.S. PATENT DOCUMENTS 4,394,622  7/1983  Yoshida et al. .......................... 318/811
5,162,709  11/1992  Ohi .......................................... 318/254

OTHER PUBLICATIONS

Trzynadlowski, A.M., et al., "Random Pulse Width Modulation Techniques for Converter–Fed Drive Systems—A Review, " IEEE Transactions on Industry Applications, vol30, No. 5, pp. 1166–1175, (Sep./Oct., 1994). .

*Primary Examiner*—Karen Masih
*Attorney, Agent, or Firm*—Foley & Lardner

[57] ABSTRACT

The invention includes: a random number generating unit which outputs a random number in driving of an AC motor by a voltage source inverter, a maximum/minimum triangular wave frequency setting unit which calculates a maximum triangular wave frequency and minimum triangular wave frequency using the inverter frequency, a triangular wave frequency calculating unit which calculates a triangular wave frequency from the random number, the maximum/minimum triangular wave frequency, and a triangular wave peak pulse, a triangular wave generating unit which calculates a triangular wave in accordance with this triangular wave frequency and outputs a triangular wave peak pulse, a voltage reference generating unit which inputs inverter current references and the motor revolution frequency, and which calculates the inverter frequency and voltage references of each phase of the inverter, and a PWM pulse generating unit which inputs the voltage references and triangular wave of each phase which are calculated and outputs a PWM pulse pattern for each phase, in accordance with the principles of pulse width modulation.

7 Claims, 11 Drawing Sheets

INVERTER CONTROL DEVICE

BACKGROUND OF THE INVENTION

1. Field of the Invention

The present invention relates to an inverter control device for controlling voltage source inverters which drive an AC motor (hereinbelow simply referred to as a motor) such as an induction motor or synchronous motor.

2. Description of the Related Art

A known inverter control device of this type is illustrated in FIG. 1. Inverter 2 is provided in the main circuit system which drives motor 1. An inverter control device 10 is provided in order to control this inverter 2. A triangular wave generating unit 14 provided within this inverter control device 10 outputs a triangular wave in accordance with a triangular wave frequency which is set by a triangular wave frequency setting unit 13. Also, a voltage reference generating unit 21 outputs three phase voltage references Vu, Vv, Vw in accordance with an externally set current reference and the motor revolution frequency which is detected by a speed sensor 3 directly linked to motor 1. A PWM (Pulse Width Modulation) pulse generating unit 22 compares these voltage references Vu, Vv, Vw with the triangular wave output from triangular wave generating unit 14, to generate three phase PWM pulses VuPWM, VvPWM, and VwPWM, which are used to perform ON/OFF control of the switching devices (elements) constituting inverter 2. Thus, the prior art voltage source inverter shown in FIG. 1 is driven by PWM pulses under the control of a modulating frequency of fixed period.

However, in the case of large-capacity inverters such as for rail vehicles etc., if the switching frequency is made high in order to deal with problems such as generation of heat due to switching losses of the inverter, as the switching frequency is restricted to a frequency of 1 kHz~2 kHz, which is most unpleasant to human ears, electromagnetic noise from the motor produced noise which was unpleasant to passengers.

One method of achieving a reduction in perceived noise is the modulation method, in which the PWM modulation frequency is changed in irregular fashion instead of being kept at a constant value. With this method, the condition for obtaining a large benefit in terms of noise reduction is that the range from maximum to minimum of the modulation frequency should be made large; however, with a large-capacity inverter, there is a limit to the extent to which the maximum value of the modulation frequency can be increased, due to problems of switching loss. Also, if the minimum value of the modulation frequency is made small, if the fundamental frequency of the inverter was large (i.e. if the revolution frequency of the motor was high), this could cause deterioration of the current control characteristic, producing instability.

SUMMARY OF THE INVENTION

Accordingly, a first object of the present invention is to provide a novel inverter control device for a large-capacity inverter in which stability of control can be guaranteed without making the switching frequency of the inverter high.

A second object of the present invention is to provide an inverter control device whereby a reduction in perceived noise can be achieved.

In order to achieve the above objects, an inverter control device according to the present invention is constructed as follows. Specifically, in the present invention, an inverter control device for a voltage source inverter which drives an AC motor such as an induction motor or synchronous motor, includes a random number generating unit which outputs a random number found from pseudo-random number calculation or random number storage means and a maximum/minimum triangular wave frequency setting unit which calculates a maximum triangular wave frequency and minimum triangular wave frequency from an inverter frequency.

The device also includes a triangular wave frequency calculating unit which inputs a random number which is output from the random number generating unit, a maximum triangular wave frequency and minimum triangular wave frequency which are calculated by the maximum/minimum triangular wave frequency setting unit, and a triangular wave peak pulse, and which calculates a triangular wave frequency in accordance with the random number between said maximum triangular wave frequency and minimum triangular wave frequency, with the timing of the rise of the triangular wave peak pulse.

The device also includes a triangular wave generating unit which calculates a triangular wave in accordance with the triangular wave frequency which is output from the triangular wave frequency calculating unit, and which outputs the triangular wave peak pulse with the timing of the maximum value and minimum value of the triangular wave. The device of the present invention further includes a voltage reference generating unit which inputs an inverter current reference and the motor revolution frequency, calculates the inverter frequency and calculates voltage references of each phase of the inverter.

Finally, the device also includes a PWM pulse generating unit which inputs the voltage references of each phase calculated by the voltage reference generating unit and the triangular wave calculated by the triangular wave generating unit, and which outputs a PWM pulse pattern for each phase in accordance with the principles of pulse width modulation.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
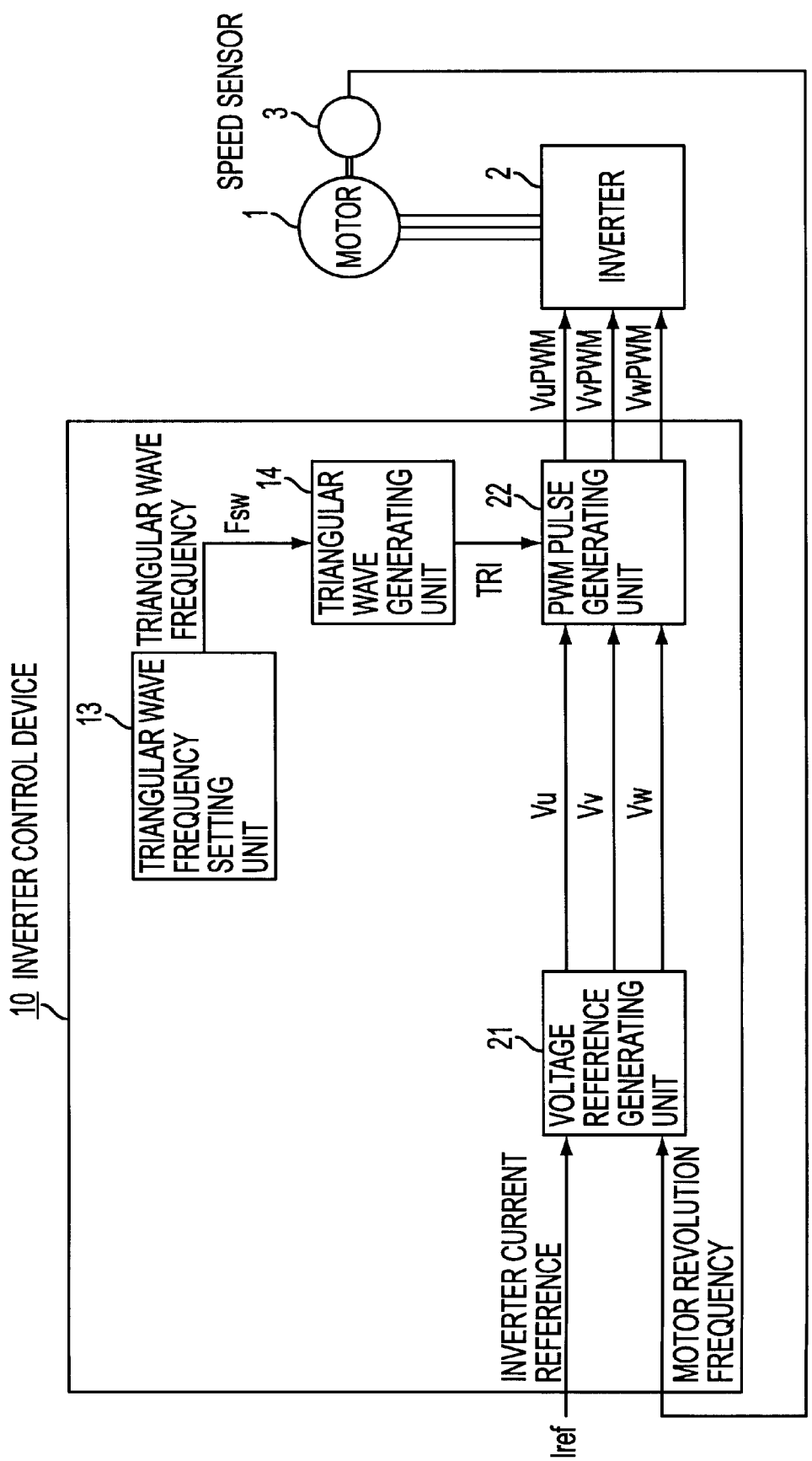
FIG. 1 is a block diagram illustrating the layout of a prior art inverter control device.

Referring now to the drawings, wherein like reference numerals designate identical or corresponding parts throughout the several views, and more particularly to FIG. 2 thereof, one embodiment of the present invention will be described.

Figure 2:
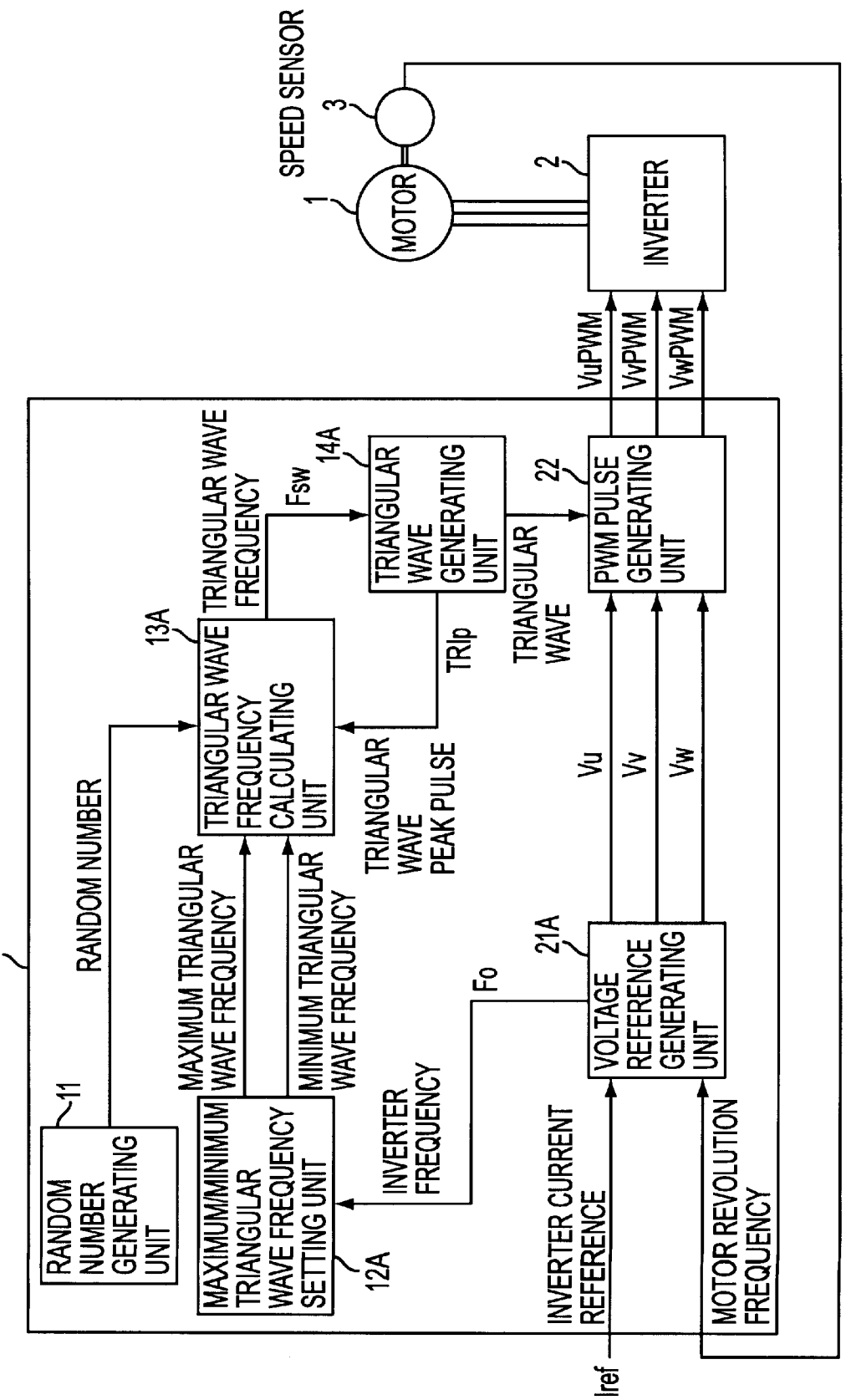
FIG. 2 is a block diagram illustrating the layout of a first embodiment of an inverter control device according to the present invention.

FIG. 2 is a block diagram illustrating the layout of a first embodiment of an inverter control device according to the present invention. In this Figure, an inverter 2 is provided in a main circuit system which drives a motor 1. This inverter 2 consists of Graetz-connected switching devices such as IGBTs (Insulated Gate Bipolar Transistors), for example, DC voltage (hereinbelow also called "link voltage") being supplied from a DC power source, not shown, to their DC terminals, while motor 1 is connected to their AC terminals. By ON/OFF control of the Graetz-connected switching devices, the DC current is then converted to PWM-modulated AC, which is supplied to motor 1. In order to control this inverter 2, a speed sensor 3 is coupled to motor 1, and there is provided an inverter control device 10A which inputs the motor revolution frequency detected by this speed sensor 3 and an inverter current reference which is externally set.

A random number generating unit 11 constituting inverter control device 10A outputs a random number found by pseudo-random number calculation and applies this to triangular wave frequency calculating unit 13A; a maximum/minimum triangular wave frequency setting unit 12A uses the inverter frequency associated with the detected motor revolution frequency to calculate the maximum triangular wave frequency and minimum triangular wave frequency and apply these to triangular wave frequency calculating unit 13A. Triangular wave frequency calculating unit 13A inputs the random number which is output from random number generating unit 11, the maximum triangular wave frequency and minimum triangular wave frequency which are calculated by the maximum/minimum triangular wave frequency setting unit 12A, and the triangular wave peak pulse, to be described below, and, with the rise timing of this triangular wave peak pulse, calculates and outputs a triangular wave frequency between the maximum triangular wave frequency and minimum triangular wave frequency corresponding to the random number; triangular wave generating unit 14A calculates a triangular wave in accordance with the triangular wave frequency which is output from triangular wave frequency calculating unit 13A, and outputs a triangular wave peak pulse with the timing of the maximum value and minimum value of the triangular wave.

Voltage reference generating unit 21A calculates the voltage reference for each phase of the inverter using the set inverter current reference and the detected motor revolution frequency, and supplies these to PWM pulse generating unit 22 and calculates the inverter frequency, which it supplies to maximum/minimum triangular wave frequency setting unit 12A; PWM pulse generating unit 22 inputs the voltage references for each phase calculated by voltage reference generating unit 21A and the triangular wave calculated by triangular wave generating unit 14A and, using the principles of pulse width modulation, controls inverter 2 by outputting a PWM pulse pattern for each phase.

The operation of the first embodiment constructed as above is described below.

First of all, random number generating unit 11 calculates a pseudo-random number Rdm(T) using the following expression, at a fixed sampling interval.

$$Rdm(T)=A \times Rdm(T-\Delta T)+B \qquad (1)$$

where A and B are positive integers and
$\Delta T$ is the sampling interval.

In this case, pseudo-random number Rdm(T) is normalized to a magnitude between 0 and 1.

Maximum/minimum triangular wave frequency setting unit 12A inputs the inverter frequency Fo, finds the maximum triangular wave frequency FswMax and minimum triangular wave frequency FswMin by calculating in accordance with the following expressions, and outputs the results.

$$FswMax=1000 \text{ (Hz)} \qquad (2)$$

$$FswMin=500+12.5 \times Fo(Fo<40 \text{ Hz}) \qquad (3)$$

$$FswMin=1000 \ (Fo \geq 40 \text{ Hz}) \qquad (4)$$

Figure 3:
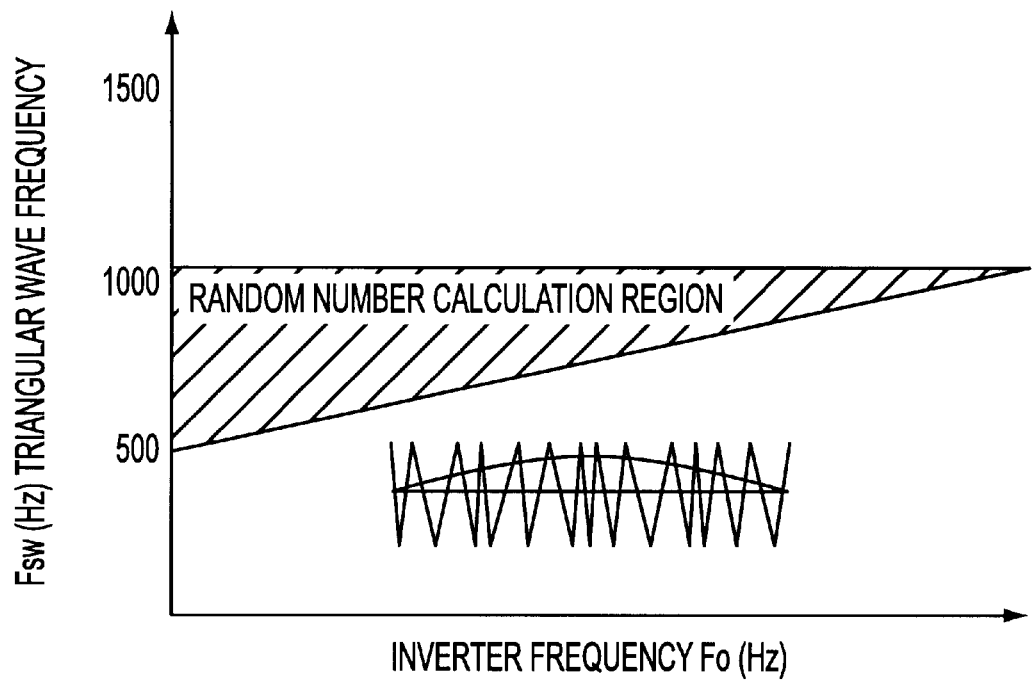
FIG. 3 is a graph showing the relationship between the switching frequency and inverter frequency, given in explanation of the operation of the first embodiment illustrated in FIG. 2.

The relationship between the inverter frequency Fo and maximum/minimum triangular wave frequencies is shown in FIG. 3 by way of example. Thus, when the inverter frequency Fo is 0 Hz, the maximum triangular wave frequency FswMax is 1000 Hz and the minimum triangular wave frequency FswMin is 500 Hz, and, when the inverter frequency Fo is 20 Hz, the maximum triangular wave frequency FswMax is 1000 Hz, while the minimum triangular wave frequency FswMin is 750 Hz. In this way, maximum/minimum triangular wave frequency setting unit 12A outputs a minimum triangular wave frequency which is varied in accordance with the inverter frequency.

Triangular wave frequency calculating unit 13A inputs random number Rdm(T), maximum triangular wave frequency FswMax, minimum triangular wave frequency FswMin, and triangular wave peak pulse TRIp, and, at the timing of the rise of the triangular wave peak pulse from 0 to 1, and at the timing of the fall from 1 to 0, finds the triangular wave frequency Fsw by calculation in accordance with the following expression, and outputs the result.

$$Fsw=FswMin+(FswMax-FswMin) \times Rdm(T) \qquad (5)$$

If the triangular wave peak pulse TRIp is unchanged, for triangular wave frequency Fsw, the value on the previous occasion is output without alteration.

Triangular wave generating unit 14A inputs triangular wave frequency Fsw, and finds and outputs triangular wave TRI and triangular wave peak pulse TRIp. In this case, a sawtooth wave of amplitude $2\pi$ (where $\pi$ is the circumferential ratio) and frequency fsw is calculated as the triangular wave phase $\theta p$, using triangular wave frequency Fsw.

$$\theta p = \int 2\pi \cdot Fsw \cdot dt \tag{6}$$

(where $\theta p = \theta p - 2\pi$) when $0 \leq \theta p < 2\pi$, $\theta p \geq 2\pi$)

From the triangular wave phase $\theta p$ which is thus found, the half triangular wave TRI whose amplitude is the inverter DC link voltage Vdc, and the triangular wave peak pulse TRIp synchronized with $\theta p$ are calculated by the following expressions:

$$\text{when } 0 \leq \theta p < \pi: TRI = (Vdc/\pi) \cdot (\pi/2 - \theta p) \tag{7}$$

$$TRIp = 1 \tag{8}$$

$$\text{when } p \leq \theta p < 2\pi: TRI = (Vdc/\pi) \cdot (\theta p - \pi 2) \tag{9}$$

$$TRIp = 0 \tag{10}$$

will be described with reference to FIG. 4.

Figure 4:
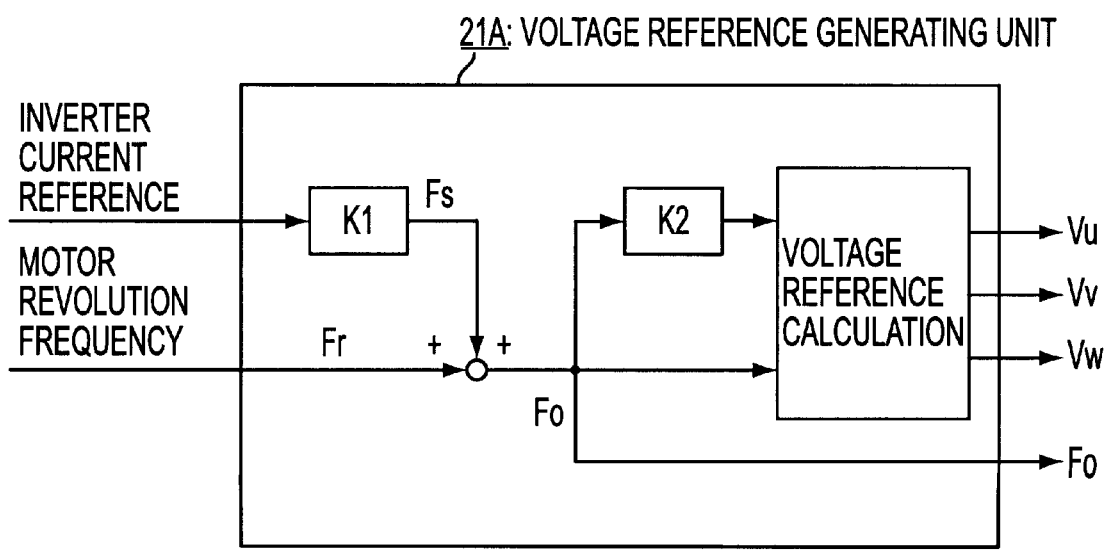
FIG. 4 is a block diagram illustrating the detailed layout of major elements given in explanation of the first embodiment illustrated in FIG. 2.

FIG. 4 illustrates a control block when the subject of inverter control is an induction motor and voltage/frequency (V/f) control of this induction motor is performed. In this case, voltage reference generating unit 21A inputs inverter current reference Iref and motor revolution frequency Fr, and finds and outputs the three phase voltage references Vu, Vv, and Vw and the inverter frequency Fo using the following calculations:

Initially, the sliding frequency Fs is found by the following expression:

$$Fs = K1 \times Iref \tag{11}$$

where K1 is a positive constant.

Next, the inverter frequency Fo is found by the calculation of the following expression:

$$Fo = Fr + Fs \tag{12}$$

Next, the inverter phase q0 is found by integrating the inverter frequency Fo by means of the following expression:

$$\theta 0 = \int Fo \cdot dt \tag{13}$$

The voltage amplitude $|V|$ of the inverter is found by the following calculation:

$$|V| = K2 \times Fo \tag{14}$$

where K2 is a positive constant.

$$Vu = |V| \times \sin(\theta 0) \tag{15}$$

$$Vv = |V| \times \sin(\theta 0 - 2/3 \cdot \pi) \tag{16}$$

$$Vw = |V| \times \sin(\theta 0 - 4/3 \cdot \pi) \tag{17}$$

PWM pulse generating unit 22 inputs the three phase voltage references Vu, Vv and Vw which are output from voltage reference generator unit 21A and the triangular wave TRI which is output from triangular wave generating unit 14A and finds the three phase PWM pulses VuPWM, VvPWM by calculating the following expression, and outputs the result:

$$\text{When } Vu \geq TRI \; VuPWM = Vdc/2 \tag{18}$$

$$\text{When } Vu < TRI \; VuPWM = -Vdc/2 \tag{19}$$

$$\text{When } Vv \geq TRI \; VvPWM = Vdc/2 \tag{20}$$

$$\text{When } Vv < TRI \; VvPWM = -Vdc/2 \tag{21}$$

$$\text{When } Vw \geq TRI \; VwPWM = Vdc/2 \tag{22}$$

$$\text{When } Vw < TRI \; VwPWM = -Vdc/2 \tag{23}$$

Thus, according to the first embodiment, in a large-capacity inverter in which the inverter switching frequency cannot be made very high, stability of control and reduction in perceived noise can be realized by: setting the maximum value and minimum value of the triangular wave frequency in accordance with inverter frequency allowing for motor revolution frequency, and obtaining a large noise reduction effect by making the minimum value of the triangular wave frequency small in a region of low motor revolution frequency wherein no problems arise regarding the current control characteristic, but, in the region in which the motor revolution frequency is high, such which mechanical noise is high, so electromagnetic noise is relatively unnoticeable, setting the triangular wave frequency to a high level so as to give priority to the current control characteristic, and setting the modulation frequency irregularly between the maximum set value and minimum set value.

It should be noted that, although, in the above embodiment, random number generating unit 11 finds a pseudo-random number Rdm(T) by calculation, it would be possible for this pseudo-random number Rdm(T) to be output by referring to a random number table stored beforehand.

Figure 5:
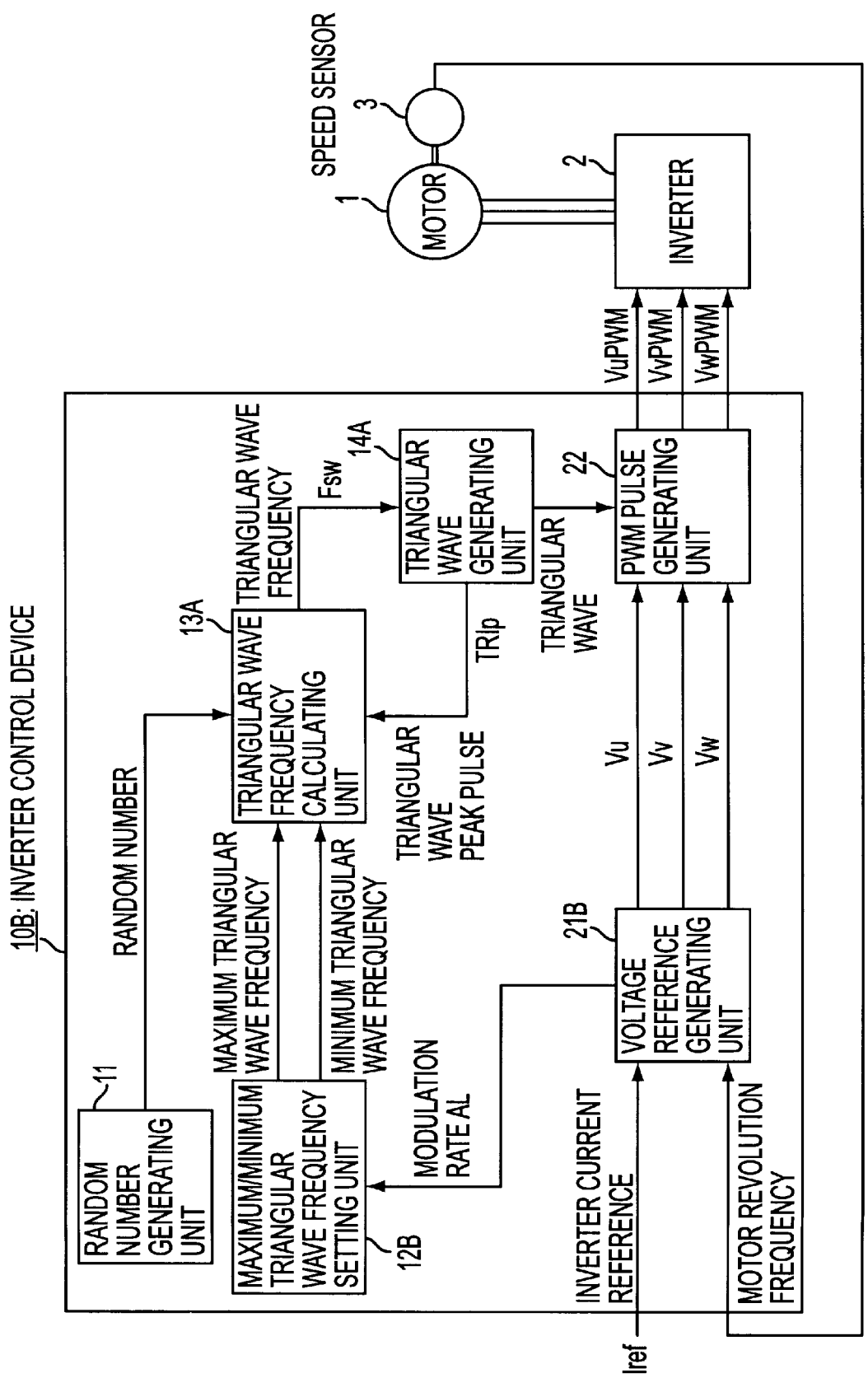
FIG. 5 is a block diagram illustrating the layout of a second embodiment of an inverter control device according to the present invention.

FIG. 5 is a block diagram illustrating the layout of a second embodiment of an inverter control device according to the present invention. In this Figure, elements which are the same as in FIG. 2 are given the same reference numerals and further description thereof is omitted. In the case of the inverter control device 10A shown in FIG. 2, a maximum/minimum triangular wave frequency setting unit 12A was provided that calculated a maximum triangular wave frequency of fixed value and a minimum triangular wave frequency allowing for the inverter frequency; however, the inverter control device 10B shown in FIG. 5 differs in construction from that shown in FIG. 2 in that voltage reference generating unit 21B is given the function of calculating a modulation coefficient AL, and maximum/minimum triangular wave frequency setting unit 12B uses this modulation rate AL to calculate the maximum triangular wave frequency and minimum triangular wave frequency.

Voltage reference generating unit 21 finds modulation rate AL by calculation of the following expression:

$$AL = |V|/Vdc \tag{24}$$

where Vdc is the DC link voltage of inverter 2.

Thereupon, maximum/minimum triangular wave frequency setting unit 12B inputs this modulation rate AL, and uses this to find the maximum triangular wave frequency FswMax and minimum triangular wave frequency FswMin indicated by the following expressions:

$$FswMax = 1000 \; (Hz) \tag{25}$$

$$FswMin = 500 + 500 \times AL \; (Hz) \tag{26}$$

Thus, according to the second embodiment shown in FIG. 5, stability of control can be further improved by setting the minimum triangular wave frequency FswMin so that it also allows for fluctuations of the DC link voltage.

Figure 6:
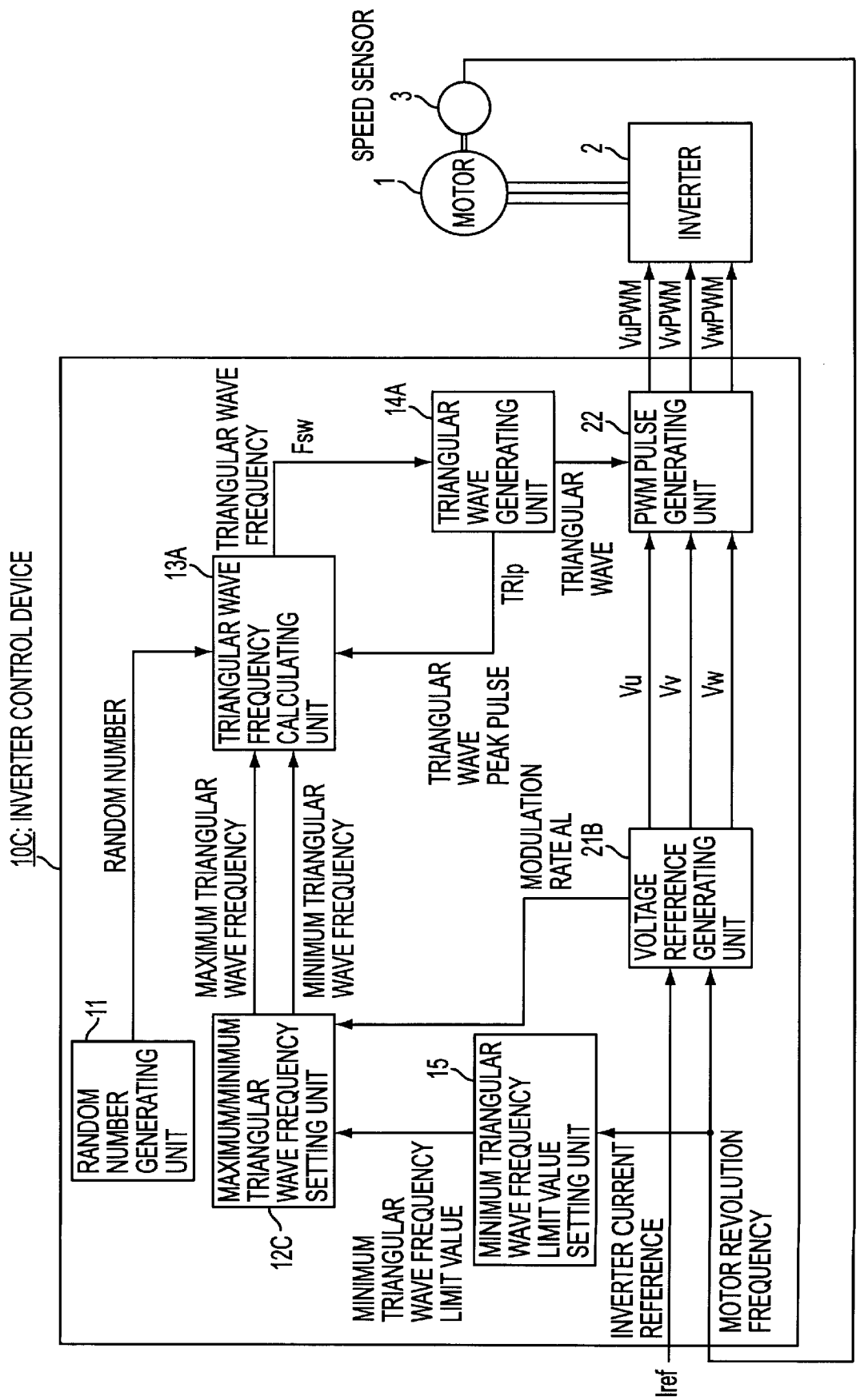
FIG. 6 is a block diagram illustrating the layout of a third embodiment of an inverter control device according to the present invention.

FIG. 6 is a block diagram showing the layout of a third embodiment of an inverter control device according to the present invention. Elements which are the same as those in FIG. 5 are given the same reference symbols in the drawing and further description thereof is omitted. Whereas in the case of the inverter control device 10B shown in FIG. 5, maximum/minimum triangular wave setting unit 12B calculated the minimum triangular wave frequency FswMin as a function of the modulation rate AL which was calculated by voltage reference generating unit 21B, the inverter control device 10C shown in FIG. 6 further comprises a minimum triangular wave frequency limit value setting unit 15 which sets a minimum triangular wave frequency limit value. Maximum/minimum triangular wave frequency setting unit 12C is arranged such that, when the minimum triangular wave frequency is found, it restricts this to the minimum triangular wave frequency limit value.

In this case, minimum triangular wave frequency limit value setting unit 15 finds the minimum triangular wave frequency limit value FswMinLim by inputting the motor revolution frequency Fr and performing calculation in accordance with the following expression, and then outputs the result.

(a) When Fr<100 Hz $$F_{sw}\text{MinLim}=500+5\times Fr \text{ (Hz)} \quad (27)$$

(b) When Fr≧100 Hz $$F_{sw}\text{MinLim}=1000 \text{ (Hz)} \quad (28)$$

Thereupon, maximum/minimum triangular wave frequency setting unit 12C inputs the modulation rate AL which is output from voltage reference generating unit 21B and the minimum triangular wave frequency limit value FswMinLim which is output from minimum triangular wave frequency limit value setting unit 15, and finds and outputs the maximum triangular wave frequency FswMax and minimum triangular wave frequency FswMin, using the following expressions:

$$F_{sw}\text{Max}=1000 \text{ (Hz)} \quad (29)$$

$$F_{sw}\text{Min}=500+500\times AL \text{ (Hz)} \quad (30)$$

where

When FswMin≧FswMinLim, FswMin=FswMin (i.e. it is not altered)

When FswMin<FswMinLim, FswMin=FswMinLim (i.e. it is set to the limiting value).

Thus, with the third embodiment shown in FIG. 6, since the minimum triangular wave frequency FswMin is set allowing for fluctuation of the DC link voltage, stability of control can be further improved, and, even in operating regions where the modulation rate is small but the speed is high, such as on re-gate start during high speed rotation, the phenomenon of control becoming unstable can be prevented, since the triangular wave frequency cannot drop below a fixed value.

Figure 7:
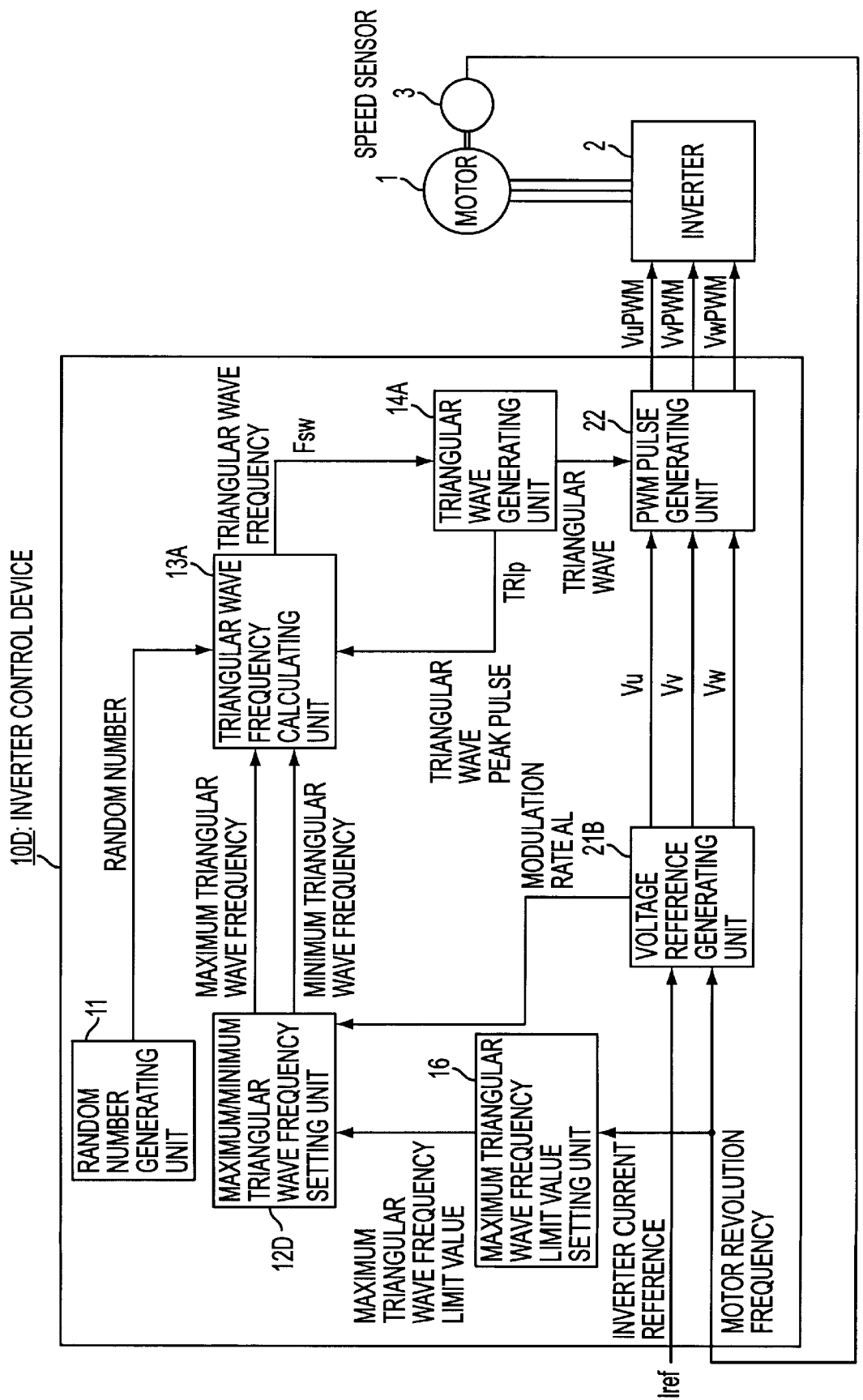
FIG. 7 is a block diagram illustrating the layout of a fourth embodiment of an inverter control device according to the present invention.

FIG. 7 is a block diagram showing a fourth embodiment of an inverter control device according to the present invention. Elements which are the same as in the case of FIG. 5 are given the same reference symbols in the drawing and further description thereof is omitted.

In the case of the inverter control device 10B shown in FIG. 5, the minimum triangular wave frequency was calculated as a function of the modulation rate AL calculated by voltage reference generating unit 21B. However, inverter control device 10D shown in FIG. 7 is further provided with a maximum triangular wave frequency limit value setting unit 16 which sets a maximum triangular wave frequency limit value, and is so arranged that, when maximum/minimum triangular wave frequency setting limit 12D finds the maximum triangular wave frequency, the maximum triangular wave frequency is restricted to the maximum triangular wave frequency limit value. In this case, maximum triangular wave frequency limit value setting unit 16 inputs inverter current reference Iref, finds the maximum triangular wave frequency limit value FswMaxLim by a calculation of the following expression, and outputs the result.

$$F_{sw}\text{MaxLim}=1000-K\times Iref \text{ (Hz)} \quad (31)$$

where K is a positive constant.

Thereupon, maximum/minimum angular wave frequency setting unit 12D inputs modulation rate AL which is output from voltage reference generating unit 21B and maximum triangular wave frequency limit value FswMaxLim which is output from maximum triangular wave frequency limit value setting unit 16, finds maximum triangular wave frequency FswMax and minimum triangular wave frequency FswMin, and outputs the result.

$$F_{sw}\text{Max}=1000 \text{ (Hz)} \quad (32)$$

$$F_{sw}\text{Min}=500+500\times AL \text{ (Hz)} \quad (33)$$

where when FswMax≧FswMaxLim, FswMax=FswMaxLim (limiting value)

when FswMax<FswMaxLim, FswMax=FswMax (i.e. the value is unaltered).

Thus, with the fourth embodiment illustrated in FIG. 7, stability of control can be further improved since a minimum triangular wave frequency FswMin is set but takes account of fluctuation of the DC link voltage, and, in an operating condition in which the current value is large, so that inverter 2 generates a lot of heat, with the result that there is little margin available as regards cooling, since the maximum triangular wave frequency FswMax is restricted to the maximum triangular wave frequency limit value, cooling can be facilitated by sacrificing noise reduction, or when cooling becomes easier the noise reduction effect can be increased by reducing the current value.

It should be noted that, if a minimum triangular wave frequency limit value setting unit 15 as shown in FIG. 6 is added to the inverter control device 10D shown in FIG. 7, the benefit can be obtained of preventing the phenomenon of instability of control, even in an operating region where the modulation rate is small but the speed is high, such as during re-gate start in high speed rotation.

Figure 8:
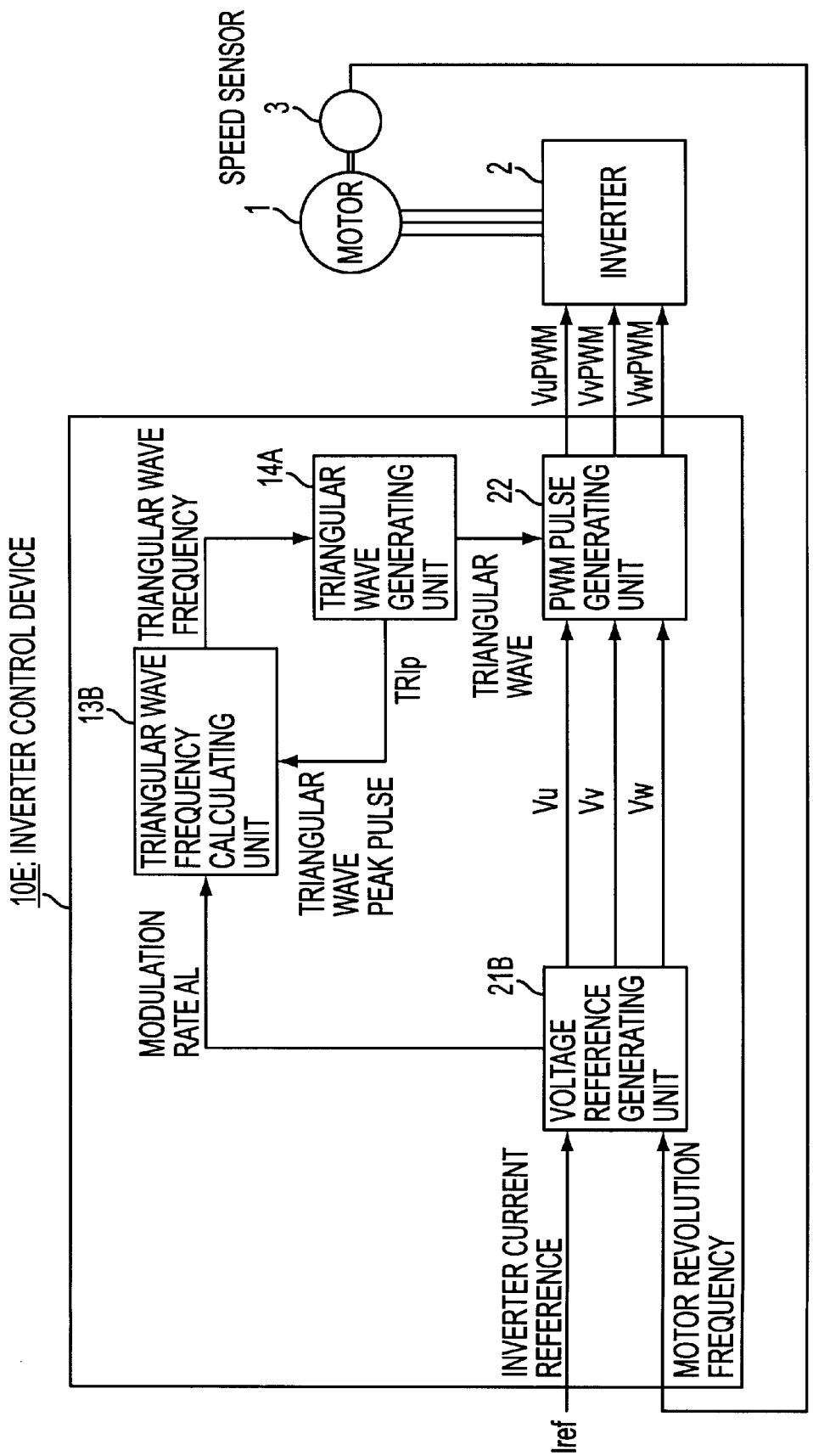
FIG. 8 is a block diagram illustrating the layout of a fifth embodiment of an inverter control device according to the present invention.

FIG. 8 is a block diagram showing the layout of a fifth embodiment of an inverter control device according to the present invention. Elements which are the same as in the case of FIG. 5 are given the same reference symbols in the drawing, and further description thereof is omitted. In the case of the inverter control device 10E shown in FIG. 8, the random number generating unit 11 and maximum/minimum triangular wave frequency setting unit 12B in FIG. 5 are eliminated; triangular wave frequency calculating unit 13B inputs modulation rate AL which is output from voltage reference generating unit 21 and triangular wave peak pulse TRIp and finds and outputs the triangular wave frequency Fsw using the following expressions, with the timing of the rise from 0 to 1 of the triangular wave peak pulse TRIp and the timing of its fall from 1 to 0.

(a) When modulation rate AL≧1

$$F_{sw}=1000+(AL-1)\times 5000 \text{ (Hz)} \quad (34)$$

(b) When modulation rate AL<1

$$Fsw=1000 \text{ (Hz)} \quad (35)$$

Figure 9:
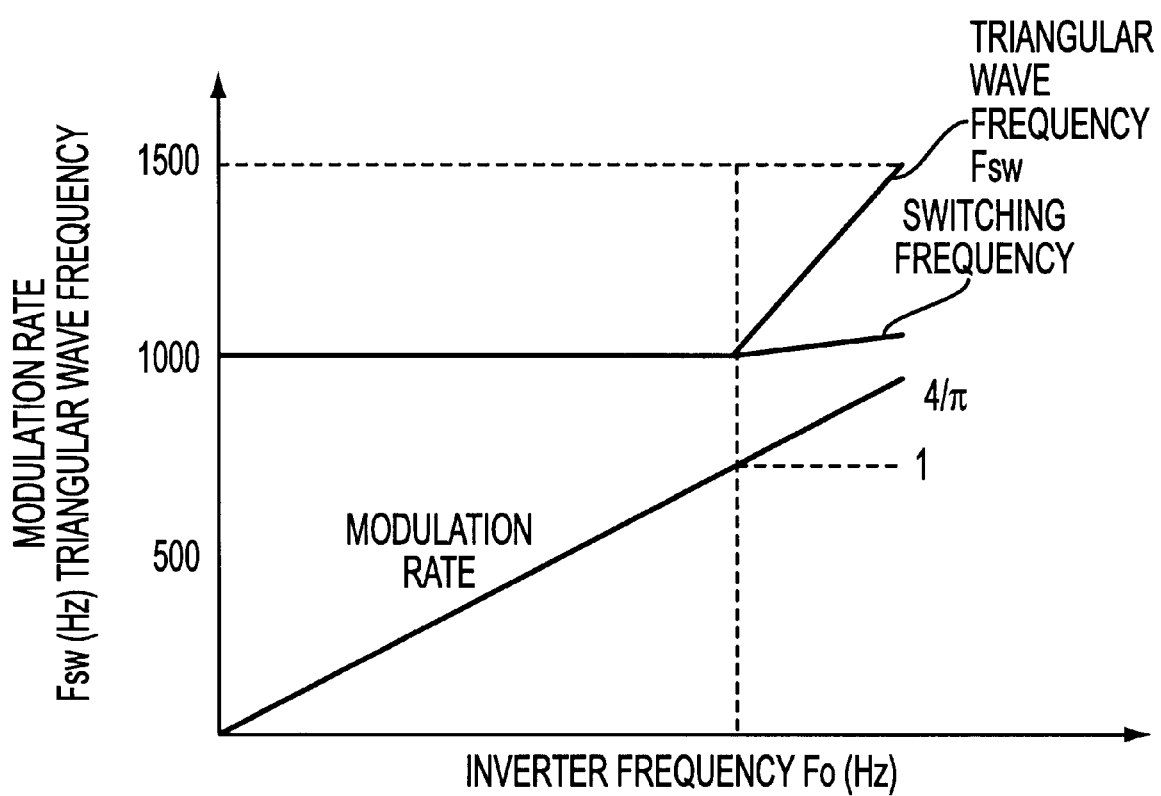
FIG. 9 is a graph illustrating the relationship between the switching frequency and inverter frequency, given in explanation of the operation of the fifth embodiment, illustrated in FIG. 8.

FIG. 9 is a graph showing these relationships. In the region where the modulation rate AL is less than 1, the triangular wave frequency Fsw is held at 1000 Hz, but in the region where the modulation rate AL exceeds 1, the triangular wave frequency Fsw increases with a large rate of change relative to the increase in modulation rate AL. In the region where the modulation rate AL is larger than 1 i.e. the so-called over-modulated PWM region, the phenomenon of instability could occur due to deterioration of the current control characteristic caused by decrease of the number of PWM pulses in one cycle of the inverter with increase of the modulation rate AL when the triangular wave frequency was low. Conventionally therefore a changeover was effected to synchronous PWM mode, in which control is comparatively stable even if the number of pulses is small. However, this could result in an unpleasant perceived noise due to change in the PWM electromagnetic noise on changeover of pulse mode.

However, with the embodiment of FIG. 5 shown in FIG. 8, the benefits are obtained that deterioration of the control characteristic in the overmodulated PWM region can be prevented and a substantial rise in the number of times of switching can also be prevented.

Figure 10:
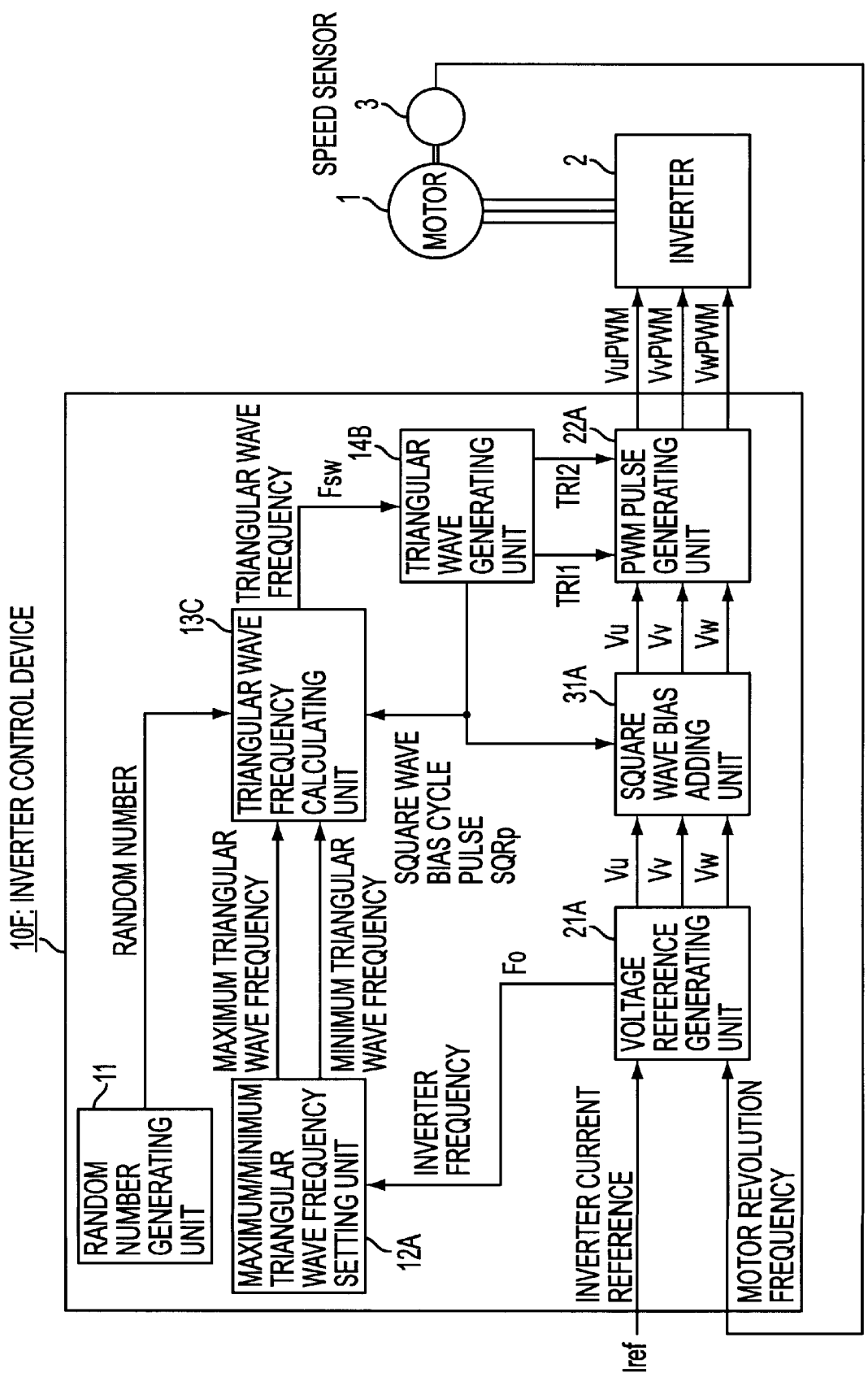
FIG. 10 is a block diagram illustrating the layout of a sixth embodiment of an inverter control device according to the present invention.

FIG. 10 is a block diagram showing the layout of a sixth embodiment of an inverter control device according to the present invention, showing in particular the case where an AC motor is driven by a three-level voltage inverter. Elements which are identical with those in FIG. 2 are given the same reference symbols and further description thereof is omitted. The inverter control device 10F in this embodiment differs from the construction of the first embodiment shown in FIG. 2 in that a triangular wave frequency calculating unit 13C and triangular wave generating unit 14B which are somewhat different in operation from the triangular wave frequency calculating unit 13A and triangular wave generating unit 14A constituting inverter control device 10A shown in FIG. 2 are provided and in that a square wave bias adding unit 31 is newly provided between voltage reference generating unit 21 and PWM pulse generating unit 22A.

Its operation will be described hereinbelow, concentrating on the parts which are of different construction to FIG. 2.

Triangular wave frequency calculating unit 13C finds and outputs the triangular wave frequency Fsw by calculation of the following expressions, using the random number Rdm (T) which is output from random number generating unit 11, the maximum triangular wave frequency FswMax, and minimum triangular wave frequency FswMin, with the timing of the rise i.e. the change from 0 to 1 of the square wave bias cycle pulse SQRp which is output from triangular wave generating unit 14B, or with the timing of the fall i.e. the change from 1 to 0 of the square wave bias cycle pulse SQRp.

(a) At the timing of the rise or fall of the square wave bias cycle pulse SQRp
Fsw=FswMin+(FswMax−FswMin)×Rdm (T)

(b) Other than at the rise or fall of square wave bias cycle pulse SQRp
Fsw maintains its previous value.

Triangular wave generating unit 14B inputs triangular wave frequency Fsw and finds triangular wave phase θp by calculation using the following expression. It then finds and outputs the positive-side triangular wave TRI1 and the negative-side triangular wave TRI2 and the square wave bias cycle pulse SQRp.

$$\theta p = \int 2\pi \cdot Fsw \cdot dt \quad (36)$$

where $0 \leq \theta p < 4\pi$. When $\theta p \geq 4\pi$, $\theta p = \theta p - 4\pi$ (one cycle is $4\pi$).

From the triangular wave phase θp which is thus found, the positive-side triangular wave TRI1, negative-side triangular wave TRI2 and square wave bias pulse SQRp whose amplitudes are ¼ of the inverter DC link voltage Vdc synchronized with θp are calculated by the following expressions and output.

(a) When $0 \leq \theta p < \pi$:

$$TRI1=(Vdc/\pi)\cdot(\pi-\theta p), \; TRI2=-TRI1 \quad (37)$$

(b) When $\pi \leq \theta p < 2p$:

$$TRI1=(Vdc/\pi)\cdot(\theta p-\pi), \; TRI2=TRI1 \quad (38)$$

(c) When $2\pi \leq \theta p < 3\pi$:

$$TRI1=(Vdc/\pi)\cdot(3\pi-\theta p), \; TRI2=-TRI1 \quad (39)$$

(d) When $3\pi \leq \theta p < 4\pi$:

$$TRI1=(Vdc/\pi)\cdot(\theta p-2\pi), \; TRI2=-TRI1 \quad (40)$$

(e) When $0 \leq \theta p < 2\pi$:

$$SQRp=1 \quad (41)$$

(f) When $2\pi \leq \theta p < 4\pi$:

$$SQRp=0 \quad (42)$$

Square wave bias adding unit 31A inputs the three phase voltage references Vu, Vv, Vw which are output from voltage reference generating unit 21A and the square wave bias cycle pulse SQRp, and outputs the new three phase voltage references obtained by the following calculations.

First of all, square wave bias Vbias is calculated as follows in accordance with the value of the square wave bias peak pulse SQRp.

(a) When $SQRp=1$: $Vbias=Vdc/4$ \quad (43)

(b) When $SQRp=0$: $-Vbias=Vdc/4$ \quad (44)

Next, the new three phase voltage references Vu, Vv and Vw are found by the following expressions:

$$Vu=Vu+Vbias \quad (45)$$

$$Vv=Vv+Vbias \quad (46)$$

$$Vw=Vw+Vbias \quad (47)$$

PWM pulse generating unit 22A inputs the three phase voltage references Vu, Vv and Vw which are output from square wave bias adding unit 31A, and the positive-side triangular wave TRI1 and negative-side triangular wave TRI2 which are output from triangular wave generating unit 14B, and finds and outputs the three phase PWM pulses VuPWM, VvPWM and VwPWM obtained by the following expressions:

(a) When $Vu \geq TRI1$: $VuPWM=Vdc/2$ \quad (48)

(b) When $TRI1 > Vu \geq TRI2$: $VuPWM=0$ \quad (49)

(c) When $TRI2 > Vu$: $VuPWM=-Vdc/2$ \quad (50)

(d) When $Vv \geq TRI1$: $VvPWM=Vdc/2$ (51)

(e) When $TRI1>Vv \geq TRI2$: $VvPWM=0$ (52)

(f) When $TRI2>Vv$: $VvPWM=-Vdc/2$ (53)

(g) When $Vw \geq TRI1$: $VwPWM=Vdc/2$ (54)

(h) When $TRI1>Vw \geq TRI2$: $VwPWM=0$ (55)

(i) When $TRI2>Vw$: $VwPWM=-Vdc/2$ (56)

Figure 11A:
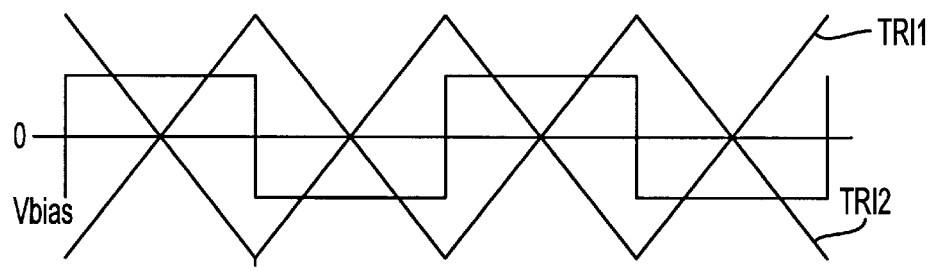
FIG. 11 is a time chart showing the relationship between the positive-side triangular wave, negative-side triangular wave, square-wave bias and square-wave bias cycle pulse with phase angle, given in explanation of the sixth embodiment, illustrated in FIG. 10.
Figure 11B:
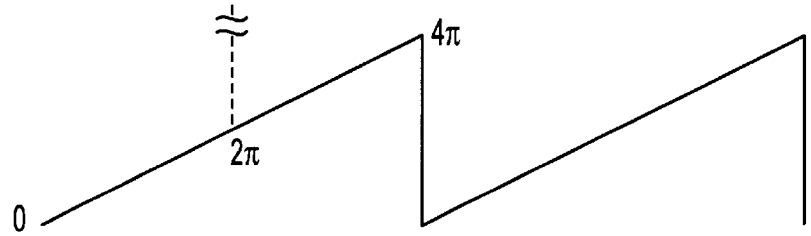
Figure 11C:

FIG. 11 is a time chart in which the positive-side triangular wave TRI1, negative-side triangular wave TRI2, square wave bias Vbias and square wave bias pulse SQRp referred to above are expressed in relation to the phase angle.

Thus, with the sixth embodiment illustrated in FIG. 10, low-noise PWM control can be realized with the DC neutral point potential fluctuation of an inverter control device according to the present invention. In particular, it is applied to an example in which an AC motor is driven by a three-level voltage inverter, the triangular wave frequency being fixed but the bias value of the square wave bias being changed in an irregular fashion. In this Figure, elements which are the same as those of FIG. 10 or FIG. 11 are given the same reference symbols and further description thereof is omitted. In this case, in inverter control device 10G, the maximum/minimum triangular wave frequency setting unit 12A in inverter control device 10F shown in FIG. 10 is omitted, and it is arranged for a random number from random number generating unit 11 and the modulation rate of voltage reference generating unit 21 to be applied to square wave bias adding unit 31B. Triangular wave frequency calculating unit 13 stores beforehand a fixed triangular wave frequency Fsw, and the triangular wave frequency Fsw of the following expression is output.

$$Fsw = 1000 \text{ Hz} \quad (57)$$

Square wave bias adding unit 31B inputs the three phase voltage references Vu, Vv and Vw which are output from voltage reference generating unit 21B, modulation rate AL, random number Rdm (T) which is output from random number generating unit 11, and the square wave bias cycle pulse SQRp which is output from triangular wave generating unit 14 and, with the timing of the rise of square wave bias cycle pulse SQRp i.e. with the timing of its change from 0 to 1, changes over the absolute value |Vbias| of the amount of bias of the square wave bias and, using this, finds the square wave bias value Vbias, which it then adds to the three phase voltage references to obtain the new three phase voltage references which are then output.

(a) On the rise of SQRp $$|Vbias|=(0.5+(1-AL/0.5) \mp (Rdm(T)-0.5)) \times Vdc/2 \quad (58)$$

(b) At times other than rise of SQRp |Vbias| maintains its previous value.

The square wave bias value Vbias is found by calculation of the following expressions from the square wave bias amount absolute value |Vbias| and the square wave bias bias pulse SQRp:

(a) When $SQRp=1$, $Vbias=|Vbias|$ (59)

(b) When $SQRp=0$, $Vbias=-|Vbias|$ (60)

Thereupon, the new three phase voltage references are as indicated by the following expressions:

$Vu=Vu+Vbias$ (61)

$Vv=Vv+Vbias$ (62)

$Vw=Vw+Vbias$ (63)

Figure 12:
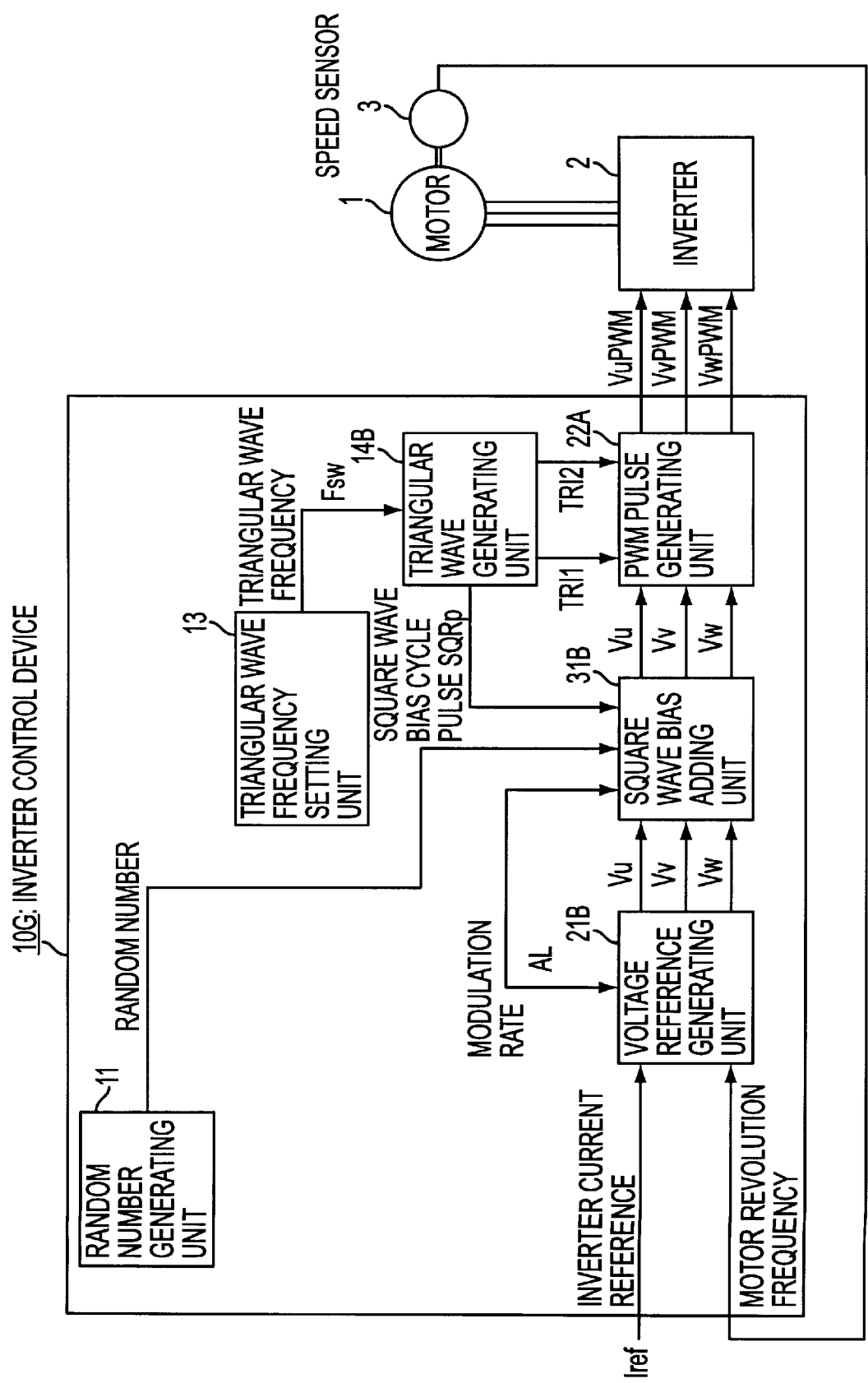
FIG. 12 is a block diagram illustrating the layout of a seventh embodiment of an inverter control device according to the present invention.

Thus, with the seventh embodiment illustrated in FIG. 12, a low-noise PWM control can be realized in which the DC neutral point potential fluctuation of a three-level inverter is kept small.

It should be noted that, although, in the embodiments described above, the case was described where the motor 1 which was the subject of control by the inverter was an induction motor, the present invention is not restricted to this, and could be applied to practically all motors generally termed AC motors, including synchronous motors.

As will be clear from the above description, according to the present invention, in a region of low motor revolution frequency in which the current control characteristic gives no problems, a large noise reduction effect is achieved by reducing the minimum value of the triangular wave frequency, but, in a region of high motor revolution frequency in which mechanical noise is considerable so electromagnetic noise is relatively unnoticeable, the minimum value of the triangular wave frequency is set to a higher value, giving priority to the current control characteristic, and the modulation frequency is set in irregular manner between the maximum set value and minimum set value of the triangular wave frequency; stability of control can thereby be maintained and a reduction in perceived noise can be realized.

Further according to the present invention, a further improvement in control stability can be achieved by setting the minimum triangular wave frequency allowing for fluctuation of the DC link voltages.

Also according to the present invention, stability of control can be further improved by setting the minimum triangular wave frequency allowing for fluctuation of the DC link voltage, and the benefit is obtained that the phenomenon of control becoming unstable can be prevented even in operating regions in which speed is high though the modulation rate is small, such as during re-gate start during high speed rotation.

Also according to the present invention, the benefits are obtained that, since the minimum triangular wave frequency is set allowing for fluctuation of the DC link voltage, stability of control can be further improved and, since, in an operating condition in which the current value is high, causing the inverter to produce a lot of heat and so allowing little margin in respect of cooling, since the maximum triangular wave frequency is restricted to a maximum triangular wave frequency limit value, cooling can be facilitated albeit sacrificing noise reduction, or, when the current is smaller and cooling is easier, the noise reduction effect can be raised.

Further according to the present invention, since the triangular wave frequency is calculated in a manner responsive to the modulation rate, the benefits are obtained that a deterioration in the control characteristic in an overmodulated PWM region can be prevented and substantial rise in the number of times of switching can be prevented.

Further according to the present invention, since new phase voltage references are obtained by adding to each phase voltage reference a square wave bias value calculated in accordance with the square wave bias cycle pulse value output from the triangular wave generating unit, the benefit is obtained that low-noise PWM control is realized while keeping the DC neutral point potential fluctuation of a three-level inverter small.

Yet further according to the present invention, since new phase voltage references are obtained by using a value obtained by adding to each phase voltage reference the value of the square wave bias calculated using the modulation rate, a random number and the square wave bias pulse, the benefit is obtained that low-noise PWM control can be realized while keeping the DC neutral point potential fluctuation of a three level inverter small.

Obviously, numerous additional modifications and variations of the present invention are possible in the light of the above teachings. It is therefore to be understood that within the scope of the appended claims, the present invention may be practiced otherwise than as specially described herein.

What is claimed as new and desired to be secured by Letters Patent of the United States is:

1. An inverter control device for voltage source inverters which drive an AC motor, comprising:

a random number generating unit which outputs a random number found from pseudo-random number calculation or random number storage means;

a maximum/minimum triangular wave frequency setting unit which calculates a maximum triangular wave frequency and minimum triangular wave frequency from an inverter frequency;

a triangular wave frequency calculating unit which inputs a random number which is output from said random number generating unit, a maximum triangular wave frequency and minimum triangular wave frequency which are calculated by said maximum/minimum triangular wave frequency setting unit, and a triangular wave peak pulse, and which calculates a triangular wave frequency in accordance with said random number between said maximum triangular wave frequency and minimum triangular wave frequency, with the timing of the rise of said triangular wave peak pulse;

a triangular wave generating unit which calculates a triangular wave in accordance with the triangular wave frequency which is output from said triangular wave frequency calculating unit, and which outputs said triangular wave peak pulse with the timing of the maximum value and minimum value of said triangular wave;

a voltage reference generating unit which inputs an inverter current reference and said motor revolution frequency, calculates said inverter frequency and calculates voltage references of each phase of the inverter; and a PWM pulse generating unit which inputs the voltage references of each phase calculated by said voltage reference generating unit and the triangular wave calculated by said triangular wave generating unit, and which outputs a PWM pulse pattern for each phase in accordance with the principles of pulse width modulation.

2. An inverter control device according to claim 1, wherein:

said voltage reference generating unit is provided with a function of calculating a modulation rate, and applies said modulation rate to said maximum/minimum triangular wave frequency setting unit, and said maximum/minimum triangular wave frequency setting unit calculates the maximum triangular wave frequency and minimum triangular wave frequency using the magnitude of said modulation rate.

3. An inverter control device according to claim 2, further comprising:

a minimum triangular wave frequency limit value setting unit which inputs said motor revolution frequency and calculates a minimum limit value of said minimum triangular wave frequency using said motor revolution frequency; and wherein said maximum/minimum triangular wave frequency setting unit, if the minimum triangular wave frequency set value which is calculated using the magnitude of said modulation rate is smaller than said minimum limit value, sets said minimum limit value as said minimum triangular wave frequency set value.

4. An inverter control device according to claim 2 or claim 3, further comprising:

a maximum triangular wave frequency limit value setting unit which inputs said motor revolution frequency and calculates a maximum limit value of said maximum triangular wave frequency; and said maximum/minimum triangular wave frequency setting unit, if the maximum triangular wave frequency set value which is calculated using the magnitude of said modulation rate is larger than said maximum limit value, outputs said maximum limit value as said maximum triangular wave frequency set value.

5. An inverter control device for voltage source inverters which drive an AC motor, comprising:

a voltage reference generating unit which inputs inverter current references and the motor revolution frequency, calculates a modulation rate, and calculates voltage references for each phase of said inverter;

a triangular wave frequency calculating unit which inputs a triangular peak pulse a modulation rate calculated by said voltage reference generating unit, outputs a fixed triangular wave frequency in an operating region in which said modulation rate is smaller than 1 and, in an over-modulated PWM region in which said modulation rate is larger than 1, calculates and outputs a triangular wave frequency responsive to the modulation rate;

a triangular wave generating unit which calculates a triangular wave in accordance with the triangular wave frequency which is output from said triangular wave frequency calculating unit, and outputs said triangular wave peak pulse with the timing of the maximum value and minimum value of said triangular wave; and a PWM pulse generating unit which inputs the voltage references for each phase calculated by said voltage reference generating unit and said triangular wave calculated by said triangular wave generating unit, and outputs PWM pulse patterns of each phase in accordance with the principles of pulse width modulation.

6. An inverter control device for voltage source inverters which drive an AC motor, comprising:

a random number generating unit which outputs a random number found from pseudo-random number calculation or random number storage means;

a maximum/minimum triangular wave frequency setting unit which calculates a maximum triangular wave frequency and minimum triangular wave frequency from an inverter frequency;

a triangular wave frequency calculating unit which inputs a random number which is output from said random number generating unit, a maximum triangular wave frequency and minimum triangular wave frequency which are calculated by said maximum/minimum triangular wave frequency setting unit, and a square wave bias cycle pulse, and which calculates a triangular wave frequency in accordance with said random number between said maximum triangular wave frequency and minimum triangular wave frequency, with the timing of the rise of said square wave bias cycle pulse;

a triangular wave generating unit which calculates a triangular wave in accordance with said triangular wave frequency which is output from said triangular wave frequency calculating unit, and which outputs said square wave bias cycle pulse which is changed over in toggle fashion alternately to the values 1 and 0 with the timing of the maximum value of said triangular wave;

a voltage reference generating unit which inputs an inverter current reference and said motor revolution frequency, calculates said inverter frequency and calculates voltage references of each phase of said inverter;

a square wave bias adding unit which inputs voltage references of each phase calculated by said voltage reference generating unit and said square wave bias cycle pulse which is output from said triangular wave generating unit, calculates a square wave bias value in accordance with said value of said square wave bias cycle pulse and which outputs as the new voltage reference for each phase a value obtained by adding this to said voltage reference of each phase; and a PWM pulse generating unit which inputs said voltage references of each phase which are output from said square wave bias adding unit and said triangular wave calculated by said triangular wave generating unit, and which outputs a PWM pulse pattern for each phase in accordance with the principles of pulse width modulation.

7. An inverter control device for voltage source inverters which drive an AC motor, comprising:

a random number generating unit which outputs a random number found from pseudo-random number calculation or random number storage means;

a triangular wave frequency setting unit which outputs a previously set triangular wave frequency;

a triangular wave generating unit which calculates a triangular wave in accordance with the triangular wave frequency which is output from said triangular wave frequency setting unit, and which outputs a bias cycle pulse which is changed over in toggle fashion alternately to the values 1 and 0 with the timing of the maximum value of said triangular wave;

a voltage reference generating unit which inputs an inverter current reference and motor revolution frequency, calculates a modulation rate and calculates voltage references of each phase of said inverter;

a square wave bias adding unit which inputs a random number output from said random number generating unit, the modulation rate and voltage references of each phase calculated by said voltage reference generating unit and said square wave bias cycle pulse which is output from said triangular wave generating unit, calculates a square wave bias value in accordance with said modulation rate and random number which are input every time said square wave bias cycle pulse changes over and which outputs as the new voltage reference for each phase a value obtained by adding this to said voltage reference of each phase of said voltage reference generating unit; and a PWM pulse generating unit which inputs said voltage references of each phase which are output from said square wave bias adding unit and said triangular wave calculated by said triangular wave generating unit, and which outputs a PWM pulse pattern for each phase in accordance with the principles of pulse width modulation.

* * * * *